United States Patent [19]

Yagi et al.

[11] 4,182,287
[45] Jan. 8, 1980

[54] TORCH PASSAGE CONSTRUCTION FOR STRATIFIED CHARGE ENGINE

[75] Inventors: Shizuo Yagi, Asaka; Isao Fujii, Hasuda; Masayasu Nishikawa, Tokyo, all of Japan

[73] Assignee: Honda Giken Kogyo Kabushiki Kaisha, Tokyo, Japan

[21] Appl. No.: 890,514

[22] Filed: Mar. 27, 1978

[30] Foreign Application Priority Data

Sep. 29, 1977 [JP] Japan .................................. 52-116087

[51] Int. Cl.$^2$ ............................................. F02B 23/00
[52] U.S. Cl. ............................... 123/75 B; 123/191 S; 123/325 T; 123/325 P; 123/32 C
[58] Field of Search ............ 123/191 S, 191 SP, 75 B, 123/32 ST, 325 P, 32 C, 32 K

[56] References Cited

U.S. PATENT DOCUMENTS

| | | | |
|---|---|---|---|
| 2,380,615 | 7/1945 | Sheppard | 123/32 K |
| 2,804,858 | 9/1957 | Schilligen | 123/32 C |
| 3,832,984 | 9/1974 | Taguchi | 123/75 B |
| 3,853,097 | 10/1974 | Kume | 123/32 SP |
| 3,989,015 | 11/1976 | Rivere | 123/32 SP |
| 4,004,563 | 1/1977 | Nakamura | 123/32 K |
| 4,076,000 | 7/1978 | Takao | 123/191 S |
| 4,098,246 | 7/1978 | Noguchi | 123/191 S |
| 4,116,191 | 9/1978 | Yanugehera | 123/191 S |

FOREIGN PATENT DOCUMENTS

| | | | |
|---|---|---|---|
| 655262 | 12/1937 | Fed. Rep. of Germany | 123/32 SP |
| 2331560 | 1/1974 | Fed. Rep. of Germany | 123/191 S |

*Primary Examiner*—Ronald H. Lazarus
*Attorney, Agent, or Firm*—Lyon & Lyon

[57] ABSTRACT

An internal combustion piston engine has a main combustion chamber and an auxiliary combustion chamber connected by a torch passage. On the suction stroke of the piston lean mixture is drawn into the main combustion chamber and rich mixture is drawn into the auxiliary combustion chamber. A spark plug ignites the mixture in the auxiliary combustion chamber at the end of the compression stroke, causing a torch flame to be projected through the torch passage into the main combustion chamber near its center. A suction conduit, smaller in diameter and total area than the torch passage, extends from a peripheral portion of the main chamber and intersects the torch passage between its ends. Movement of the burning gases through the torch passage aspirates a flow of mixture from the main combustion chamber through the suction conduit into the torch passage.

7 Claims, 10 Drawing Figures

TORCH PASSAGE CONSTRUCTION FOR STRATIFIED CHARGE ENGINE

The device of this invention is similar in many respects to the disclosures of the copending applications of Yagi et al Ser. Nos. 890,511 and 890,512 filed of even date herewith.

This invention relates to a four-cycle internal combustion piston engine and its object is to reduce CO and HC emissions as well as $NO_x$ emission in the exhaust of the engine, as well as to improve fuel consumption. These emission characteristics take place over the entire range of operation loads on the engine.

Engines of this type employ a first carburetor to supply a relatively lean air-fuel mixture to the main combustion chamber and a second carburetor to supply relatively rich air-fuel mixture to the auxiliary combustion chamber. A torch passage extends from the auxiliary combustion chamber to the main combustion chamber and has an outlet end positioned near the center of the main combustion chamber. A spark plug communicates with the auxiliary combustion chamber. A suction conduit intersects the torch passage at a location between its ends and this suction conduit communicates with a peripheral portion of the main combustion chamber. At the end of the compression stroke of the piston a spark plug communicating with the auxiliary combustion chamber ignites the mixture therein and sends a burning mixture or torch flame through the torch passage and into the main combustion chamber to ignite the relatively lean mixture therein. This flow through the torch passage induces a flow of mixture from the main combustion chamber through the suction conduit and into the torch passage. The combustion in the main chamber is improved for all loading conditions of the engine, from idling to full load, and this results in improvement of HC and $NO_x$ emissions.

Other objects and advantages will appear hereinafter.

Figure 1:
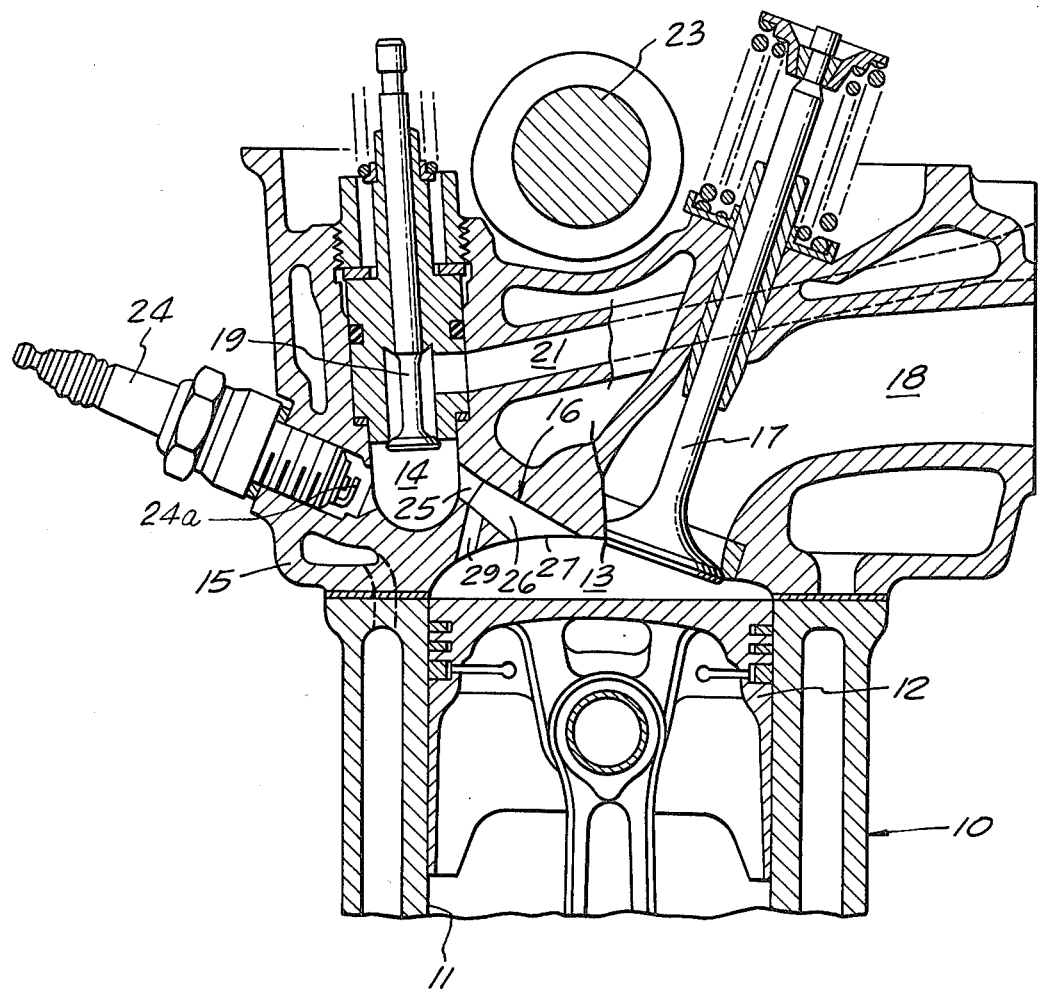
FIG. 1 is a sectional elevation partly broken away showing a preferred embodiment of this invention.

Referring to the drawings, the internal combustion engine generally designated 10 is provided with a cylinder 11 and a piston 12, the latter forming one wall of the main combustion chamber 13. An auxiliary combustion chamber 14 is mounted in the engine head 15 and is connected to the main combustion chamber 13 by means of the torch passage 16 in the engine head 15. A main intake valve 17 controls the flow of relatively lean mixture from a first carburetor, not shown, which supplies the main intake passage 18. An auxiliary intake valve 19 controls the relatively rich mixture supplied by a second carburetor, not shown, through the auxiliary intake passage 21. An exhaust valve 22 (see FIG. 2) is also provided for the main combustion chamber 13. All three valves 17, 19 and 22 are operated from the cam shaft 23 by means of conventional mechanism, not shown. A spark plug 24 communicates with the auxiliary combustion chamber 14, but its electrodes 24a do not project into it. The torch passage 16 is located in a position remote from the spark plug electrodes 24a.

As shown in FIG. 1, the torch passage 16 has a first portion 25 which is cylindrical and which communicates with the auxiliary combustion chamber 14. The torch passage 16 has a second portion 26 which is tapered and which communicates at its outlet end 27 with the main combustion chamber 13 near the center thereof. A suction conduit 29 intersects the tapered portion 26 of the torch passage 16 adjacent the location where the cylindrical portion 25 and the tapered portion 26 are joined. The axes of the relatively torch passage 16 and the relatively short suction conduit 29 lie in the same plane, which plane contains the axis of the piston 12. All portions of the torch passage 16 are larger in diameter than the suction conduit 29.

In operation, a relatively lean air-fuel mixture is drawn into the main combustion chamber 13 from the main intake passage 18 during the intake stroke of the piston 12. At the same time relatively rich air-fuel mixture is drawn into the auxiliary combustion chamber 14 from the auxiliary intake passage 21. At the end of the compression stroke of the piston the spark plug 24 ignites the mixture in the auxiliary combustion chamber 14, causing a flame of burning mixture to pass from the auxiliary chamber 14 through the torch passage 16 and into the main combustion chamber 13 to burn the lean mixture therein.

Movement of the burning gases through the torch passage 16 causes a flow of mixture from the main combustion chamber 13 to pass through the suction conduit 29 and into the torch passage 16 by aspiration. This movement of lean mixture from the peripheral portion of the main combustion chamber 13 through the suction conduit 29 has been found to cause a double burning sequence which produces a marked improvement in emissions of CO, HC and $NO_x$. Color photographs taken through a transparent window of a test engine show that burning is first initiated in the main combustion chamber 13 near the outlet 27 of the torch passage 16. Combustion then spreads from the center of the main combustion chamber 13 toward the periphery thereof.

The angle between the axis of the torch passage and the axis of the suction conduit is such as to produce the aspiration effect; ordinarily the angle may lie in the range of 50° to 80°. The ends of the suction conduit or conduits communicating with the main combustion chamber are located in the outer periphery of that chamber, that is, the space lying outside a circle having one-half the diameter of the main combustion chamber and concentric therewith. A second burning sequence of the same nature follows very shortly thereafter. Induction of the unburned mixture through the suction conduit 29 from the outer periphery of the main combustion chamber 13 is an important feature of this invention. This unburned mixture is not initially reached by the flame from the torch passage 16 and therefore aspiration of this unburned mixture through the suction conduit, aided by pressure increase in the main combustion chamber, results in improved combustion in the outer periphery of the main chamber. This in turn reduces CO, HC and $NO_x$ in the exhaust gases. The overall air-fuel ratio is on the lean side of the stoichiometric ratio and therefore good fuel economy is achieved.

Figure 3:
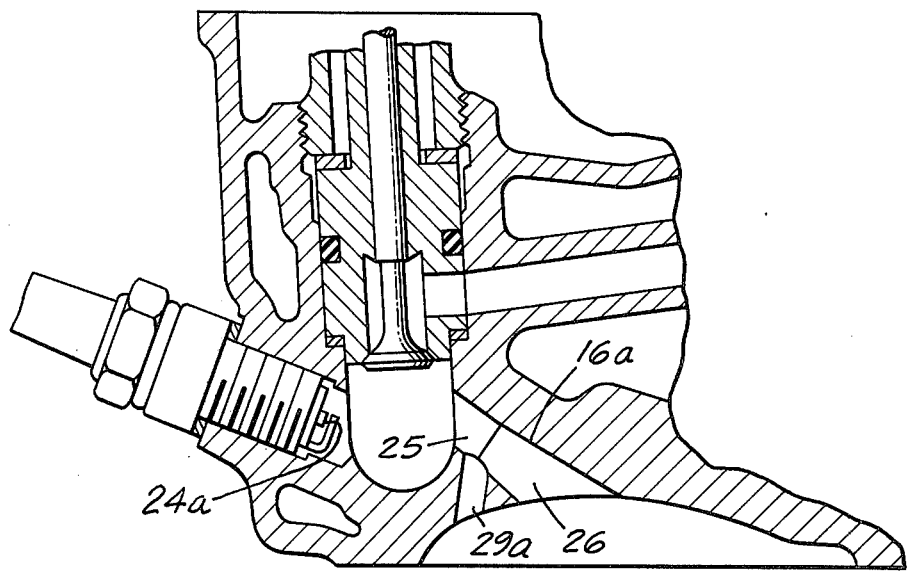
FIG. 3 is a sectional elevation, partly broken away, of a modified form of cylinder head.
Figure 4:
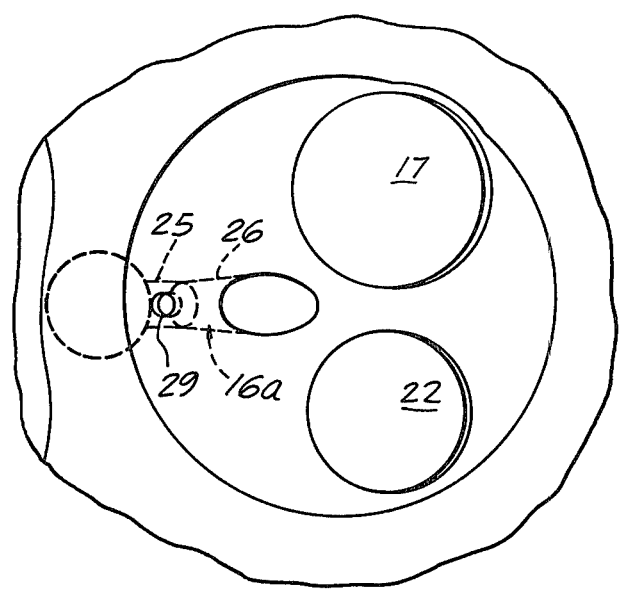
FIG. 4 is a view of the underside of the cylinder head of FIG. 3.

In the modified form of the invention shown in FIGS. 3 and 4, the torch passage 16a is intersected by the suction conduit 29a at the joint between the cylindrical portion 25 and the tapered portion 26.

Figure 5:
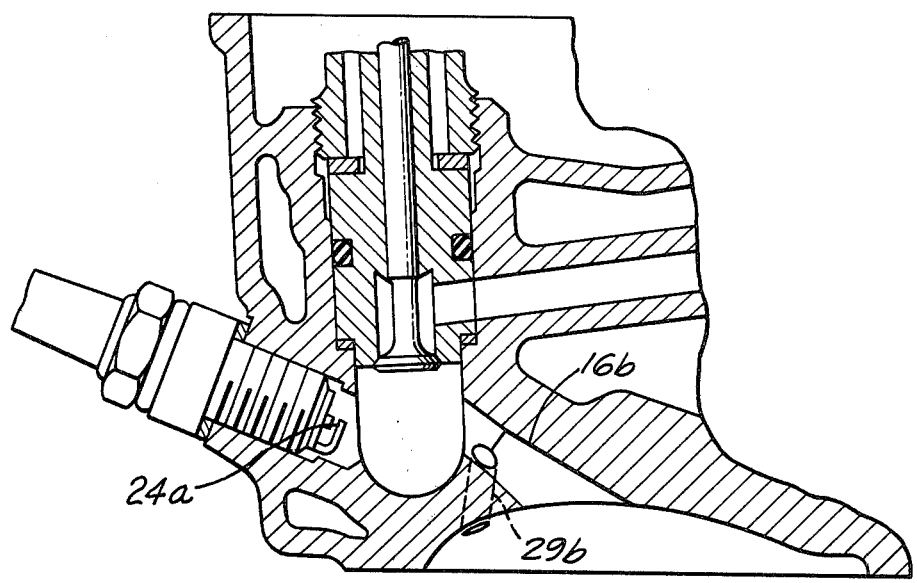
FIG. 5 is a view similar to FIG. 3 showing another modification.
Figure 6:
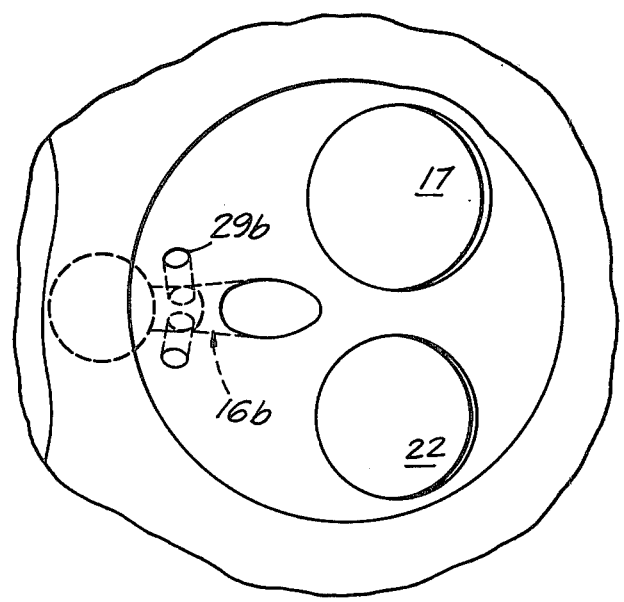
FIG. 6 is a view of the underside of the cylinder head shown in FIG. 5.

In the modified form of the invention shown in FIGS. 5 and 6, two diverging suction conduits 29b extend laterally from the torch passage 16b.

Figure 7:
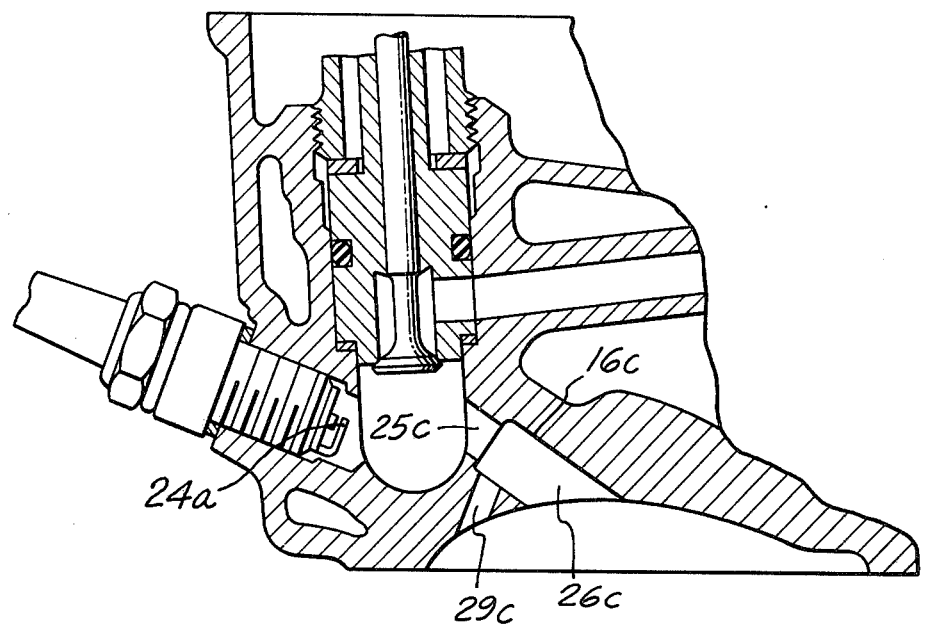
FIG. 7 is a view similar to FIG. 3 showing another modification.
Figure 8:
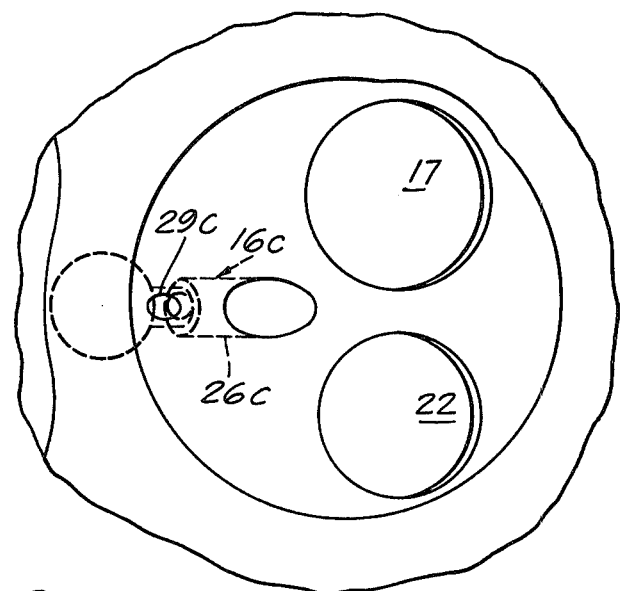
FIG. 8 is a view of the underside of the cylinder head shown in FIG. 7.

In the modified form of the invention shown in FIG. 7 and 8, the torch passage 16c has a first cylindrical portion 25c and a second cylindrical portion 26c. The suction conduit 29c joins the cylindrical portion 26c near its joint with the smaller cylindrical portion 25c.

Figure 9:
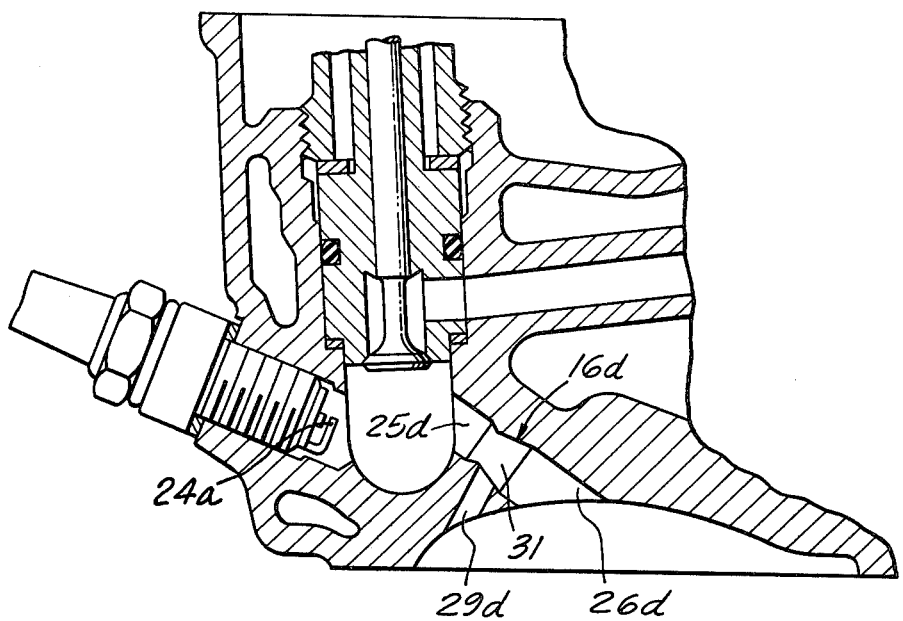
FIG. 9 is a view similar to FIG. 3 showing another modification.
Figure 10:
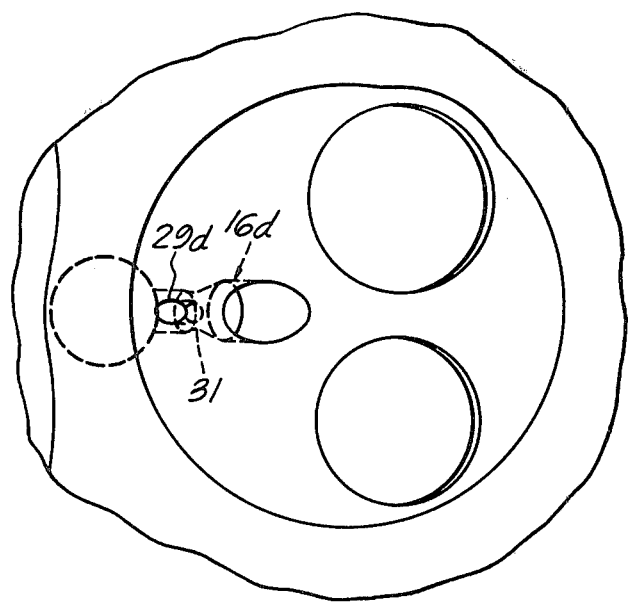
FIG. 10 is a view of the underside of the cylinder head shown in FIG. 9.

In the modified form of the invention shown in FIGS. 9 and 10, the torch passage 16d is shaped similarly to a venturi passage in that a central portion 31 is smaller in diameter than the inlet portion 25d or the outlet portion 26d. The suction conduit 29d intersects the smaller diameter portion 31.

Figure 2:
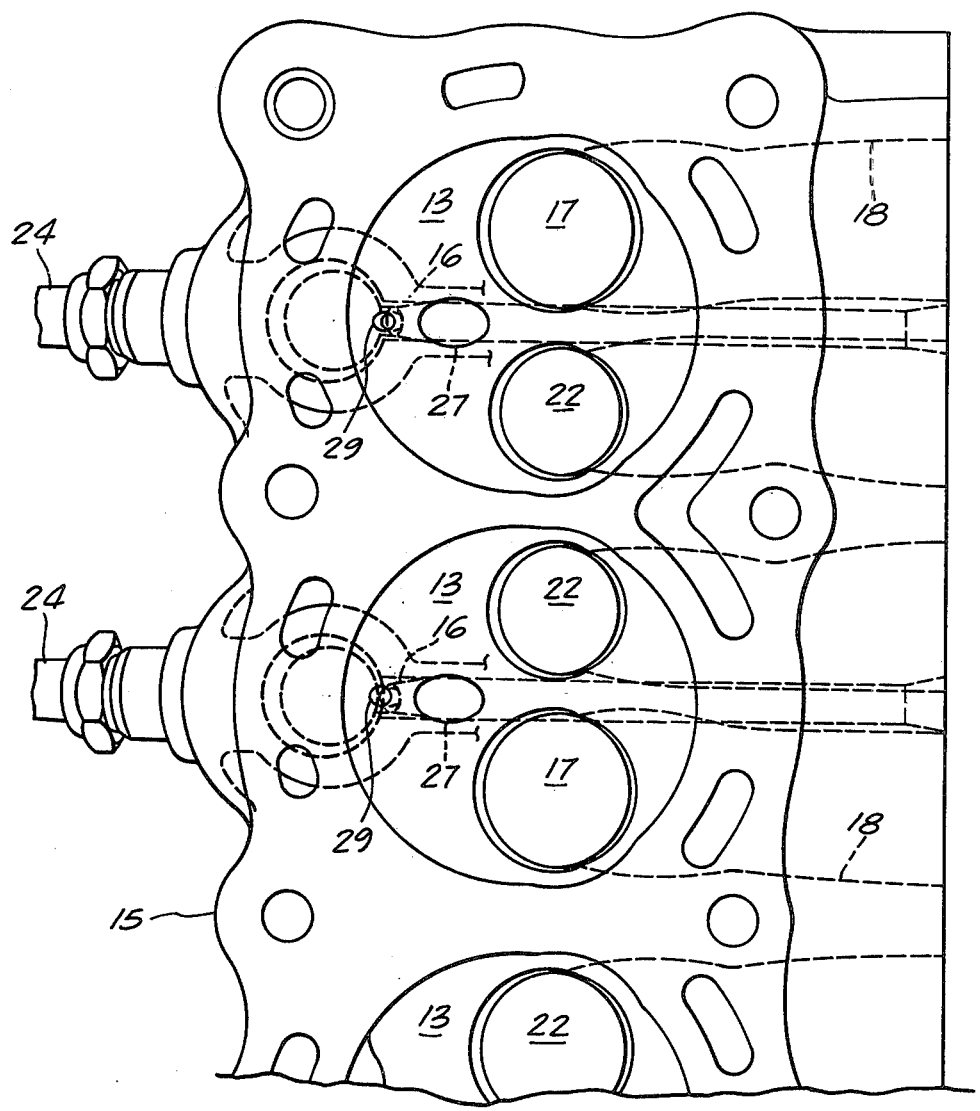
FIG. 2 is a view of the underside of the cylinder head of the engine, partly broken away, and showing the main combustion chambers.

In all other respects, the construction and operation of the modified forms of the invention shown in FIGS. 3-4, 5-6, 7-8, and 9-10 are the same as that described above in connection with the preferred form of the invention shown in FIGS. 1 and 2.

Having fully described our invention, it is to be understood that we are not to be limited to the details herein set forth but that our invention is of the full scope of the appended claims.

We claim:

1. In an internal combustion piston engine, the combination of: walls forming a main combustion chamber, a piston forming one wall of said chamber, means forming an auxiliary combustion chamber, a spark plug having electrodes communicating with said auxiliary combustion chamber, means including a main intake passage for supplying a relatively lean air-fuel mixture to said main combustion chamber, means including an auxiliary intake passage for supplying a relatively rich air-fuel mixture to said auxiliary combustion chamber, a relatively long torch passage extending from said auxiliary combustion chamber to said main combustion chamber and having an outlet end positioned near the center of said main combustion chamber, said torch passage being positioned at a location remote from said spark plug electrodes, and a relatively short suction conduit intersecting said torch passage at a location between its ends and extending to a peripheral zone of said main combustion chamber, the cross section area of said torch passage being greater than that of said suction conduit, whereby movement of burning air-fuel mixture through said torch passage aspirates a flow of air-fuel mixture from said main combustion chamber through said suction conduit into said torch passage.

2. In an internal combustion piston engine, the combination of: walls forming a main combustion chamber, a piston forming one wall of said chamber, means forming an auxiliary combustion chamber, a spark plug having electrodes communicating with said auxiliary combustion chamber, means including a main intake passage for supplying a relatively lean air-fuel mixture to said main combustion chamber, means including an auxiliary intake passage for supplying a relatively rich air-fuel mixture to said auxiliary combustion chamber, a torch passage extending from said auxiliary combustion chamber to said main combustion chamber and having an outlet end positioned near the center of the main combustion chamber, the torch passage having a short cylindrical portion adjacent said auxiliary chamber and having a long tapered portion flaring therefrom toward said main chamber, said torch passage being located at a position remote from said spark plug electrodes, and a suction conduit intersecting said tapered portion of said torch passage at a location adjacent said cylindrical portion and extending to a peripheral zone of said main combustion chamber, said torch passage being longer than said suction conduit, the cross section area of said torch passage being greater than that of said suction conduit, whereby movement of burning air-fuel mixture through said torch passage aspirates a flow of air-fuel mixture from said main combustion chamber through said suction conduit into said torch passage.

3. In an internal combustion piston engine, the combination of: walls forming a main combustion chamber, a piston forming one wall of said chamber, means forming an auxiliary combustion chamber, a spark plug having electrodes communicating with said auxiliary combustion chamber, means including a main intake passage for supplying a relatively lean air-fuel mixture to said main combustion chamber, means including an auxiliary intake passage for supplying a relatively rich air-fuel mixture to said auxiliary combustion chamber, a torch passage extending from said auxiliary combustion chamber to said main combustion chamber and having an outlet end positioned near the center of said main combustion chamber, the torch passage having a short cylindrical portion adjacent said auxiliary chamber and having a long tapered portion flaring therefrom toward said main chamber, said torch passage being positioned at a location remote from said spark plug electrodes, and a suction conduit intersecting said torch passage at the junction of the cylindrical portion and the tapered portion, and extending to a peripheral zone of said main combustion chamber, said torch passage being longer than said suction conduit, the cross section area of said torch passage being greater than that of such suction conduit, whereby movement of burning air-fuel mixture through said torch passage aspirates a flow of air-fuel mixture from said main combustion chamber through said suction conduit into said torch passage.

4. In an internal combustion piston engine, the combination of: walls forming a main combustion chamber, a piston forming one wall of said chamber, means forming an auxiliary combuston chamber, a spark plug having electrodes communicating with said auxiliary combustion chamber, means including a main intake passage for supplying a relatively lean air-fuel mixture to said main combustion chamber, means including an auxiliary intake passage for supplying a relatively rich air-fuel mixture to said auxiliary combustion chamber, a torch passage extending from said auxiliary combustion chamber to said main combustion chamber and having an outlet end positioned near the center of said main combustion chamber, the torch passage having a short cylindrical portion adjacent said auxiliary chamber and having a long tapered portion flaring therefrom toward said main chamber, said torch passage being positioned at a location remote from said spark plug electrodes, and a plurality of diverging suction conduits each intersecting said torch passage at a junction of the cylindrical portion and the tapered portion, and extending to a peripheral zone of said main combustion chamber, said torch passage being longer than said suction conduits, the cross section area of said torch passage being greater than that of such suction conduits, whereby movement of burning air-fuel mixture through said torch passage aspirates a flow of air-fuel mixture from said main combustion chamber through said suction conduits into said torch passage.

5. In an internal combustion piston engine, the combination of: walls forming a main combustion chamber, a piston forming one wall of said chamber, means forming an auxiliary combustion chamber, a spark plug having electrodes communicating with said auxiliary combustion chamber, means including a main intake passage for supplying a relatively lean air-fuel mixture to said main combustion chamber, means including an auxiliary intake passage for supplying a relatively rich air-fuel mixture to said auxiliary combustion chamber, a torch passage extending from said auxiliary combustion chamber to said main combustion chamber and having an outlet end positioned near the center of said main combustion chamber, the torch passage having a relatively small-diameter short cylindrical portion adjacent said auxiliary chamber and an aligned relatively large-diameter long cylindrical portion extending therefrom to said main chamber, said torch passage being positioned at a location remote from said spark plug electrodes, and a suction conduit intersecting said large-diameter portion of said torch passage at a location between its ends and extending to a peripheral zone of said main combustion chamber, the cross section area of said torch passage being greater than that of said suction conduit, whereby movement of burning air-fuel mixture through said torch passage aspirates a flow of air-fuel mixture from said main combustion chamber through said suction conduit into said torch passage.

6. In an internal combustion piston engine, the combination of: walls forming a main combustion chamber, a piston forming one wall of said chamber, means forming an auxiliary combustion chamber, a spark plug having electrodes communicating with said auxiliary combustion chamber, means including a main intake passage for supplying a relatively lean air-fuel mixture to said main combustion chamber, means including an auxiliary intake passage for supplying a relatively rich air-fuel mixture to said auxiliary combustion chamber, a torch passage extending from said auxiliary combustion chamber to said main combustion chamber and having an outlet end positioned near the center of said main combustion chamber, said torch passage having a restricted portion between its ends and a suction conduit intersecting said torch passage at said restricted portion and extending to a peripheral zone of said main combustion chamber, said torch passage being positioned at a location remote from said spark plug electrodes, the cross section area of said torch passage being greater than that of said suction conduit, whereby movement of burning air-fuel mixture through said torch passage aspirates a flow of air-fuel mixture from said main combustion chamber through said suction conduit into said torch passage.

7. The method of operating a four-cycle internal combustion spark ignition piston engine comprising the steps of: drawing a relatively lean air-fuel mixture into a main combustion chamber during the intake stroke of the piston, simultaneously drawing a relatively rich air-fuel mixture into an auxiliary combustion chamber during the intake stroke of the piston, igniting the mixture in the auxiliary combustion chamber at the end of the compression stroke of the piston, directing a stream of burning mixture from the auxiliary combustion chamber into the main combustion chamber near its center, and aspirating a flow of air-fuel mixture from a peripheral portion of the main combustion chamber into said stream of burning mixture.

* * * * *

UNITED STATES PATENT AND TRADEMARK OFFICE
CERTIFICATE OF CORRECTION

PATENT NO. : 4,182,287
DATED : January 8, 1980
INVENTOR(S) : Shizuo Yagi et al

It is certified that error appears in the above-identified patent and that said Letters Patent are hereby corrected as shown below:

Column 2, line 23, after "relatively" insert --long--.

Column 4, line 57, "mis-" at end of line should read --mix- --.

Signed and Sealed this

Twenty-second Day of April 1980

[SEAL]

Attest:

SIDNEY A. DIAMOND

Attesting Officer        Commissioner of Patents and Trademarks